United States Patent [19]

Quehen

[11] 4,356,714
[45] Nov. 2, 1982

[54] APPARATUS FOR DETECTING FAULTS IN THE INHERENT FLATNESS OF A STRETCHED STRIP IN MOVEMENT

[75] Inventor: Andre Quehen, Pontoise, France
[73] Assignee: SECIM, Courbevoie, France
[21] Appl. No.: 195,063
[22] Filed: Oct. 7, 1980

[30] Foreign Application Priority Data

Oct. 26, 1979 [FR] France ................................. 79 26618

[51] Int. Cl.³ ............................................. B21B 37/12
[52] U.S. Cl. ............................................ 72/17; 73/159
[58] Field of Search .......................... 72/12, 17, 18, 9; 73/159

[56] References Cited

U.S. PATENT DOCUMENTS 3,481,194  12/1969  Sivilotti et al. ....................... 73/159

FOREIGN PATENT DOCUMENTS 1088652  10/1967  United Kingdom ................... 72/17

*Primary Examiner*—Lowell A. Larson

*Attorney, Agent, or Firm*—Pollock, Vande Sande & Priddy

[57] ABSTRACT

Apparatus for detecting faults in inherent flatness in a moving stretched strip, comprising a deflector roll in the form of a cylinder covered by a thin casing. Cavities are machined in the cylinder and arranged on a helix traced on the roll. Each cavity contains a displacement detector whose moving part in contact with the inner surface of the thin casing moves in the radial direction of the roll under the action of the stresses exerted by the sheet. The detectors have a primary winding and a secondary winding through which passes a core, solid with the moving part of the detector. The apparatus includes an optical encoding system for marking the angular position of the roll and a programming apparatus for sending a pulse of current to the primary windings of the detectors once under load and once not under load. A collector and processor for the emitted signals allow calculation of the values proportional to the tension in the strip, along its width. The invention may be used, for example, for monitoring the inherent flatness of thin, cold-rolled sheets.

4 Claims, 5 Drawing Figures

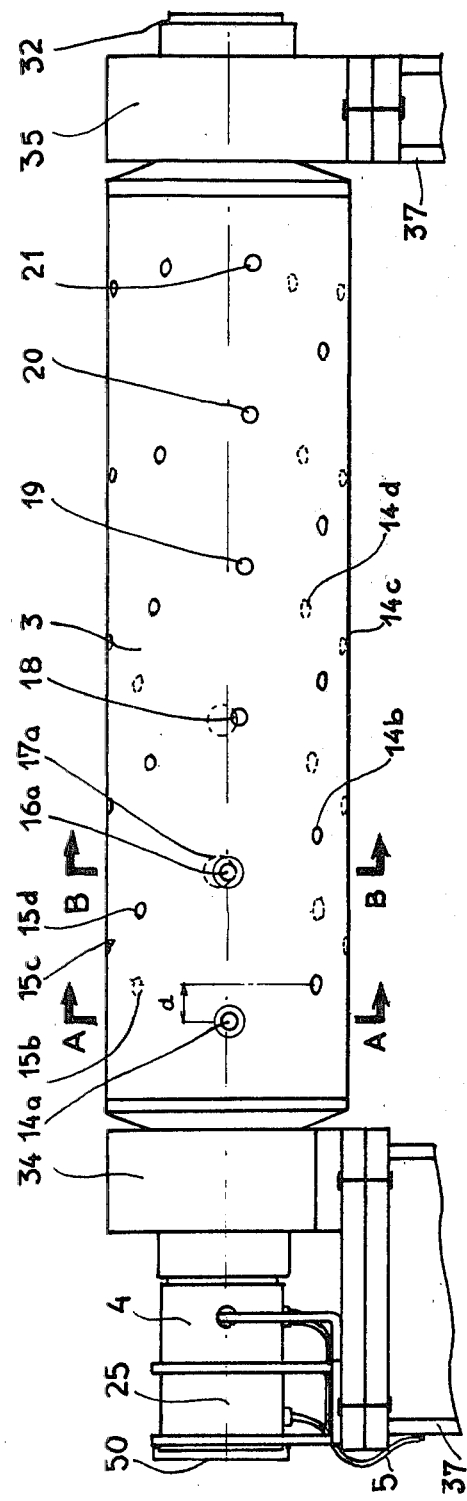
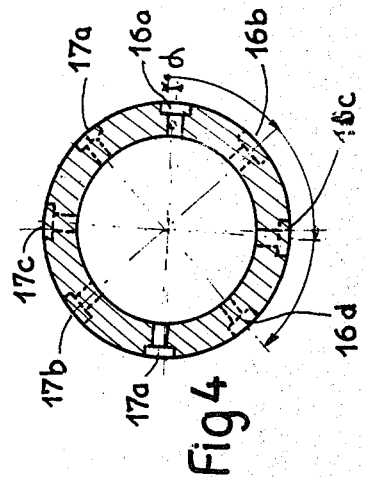
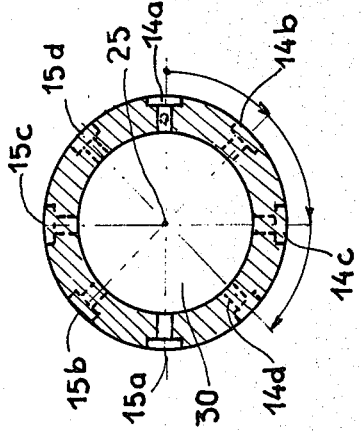

APPARATUS FOR DETECTING FAULTS IN THE INHERENT FLATNESS OF A STRETCHED STRIP IN MOVEMENT

FIELD OF THE INVENTION

The invention concerns an apparatus for detecting faults in the inherent flatness of a moving stretched strip in movement, such as a strip of sheet metal during or at the end of a rolling or drawing operation.

In rolling metal strips, more especially when cold rolling thin strips, it is very necessary to detect faults in the inherent flatness of these strips and to correct these faults by acting on the rolling conditions or to carry out a simple test of the quality of the product at the end of the operation. To carry out this adjustment or this test, a deflector roll is generally used over which the sheet metal to be tested passes.

BACKGROUND

Various types of roll have been proposed, comprising a continuous outer casing to avoid marking the sheet metal which is generally, at the moment it is tested, at the end of the manufacturing cycle and which exhibits a very good surface state, this outer casing surrounding a cylinder in which apparatuses are disposed for measuring the distribution in the axial direction of radial stresses exerted by the sheet metal on the roll, through the thin flexible outer casing.

Faults in inherent flatness actually arise from different relative reductions in the thickness of the strip, across its width.

The different parts of this sheet metal undergoing different reductions therefore tend to lengthen in a correspondingly different way. At it is not possible for them to lengthen independently of each other, a state of inner stress appears in the sheet metal.

When the material is not thick and rigid enough to take this state of stress, faults in inherent flatness appear in the form of pockets at the center of the sheet metal or waves at the edges thereof.

During cold rolling operations, very great pulling stresses are exerted on the sheet metal, causing higher stresses to appear in the strip of sheet metal which can prevent visual testing of inner stresses.

When the sheet metal moves under tension over the deflector roll, the state of stresses in the different parts of the sheet metal in the transverse direction, i.e. in the axial direction of the roll, causes disparities in the distribution of radial stresses exerted by the sheet metal on the various measuring apparatuses.

Knowledge of the axial distribution of the radial stresses exerted by the sheet metal on the roll thus allows detection of faults in inherent flatness during or at the end of rolling of the sheet metal, when this is under tension.

In a known apparatus, it has been proposed to dispose the various detectors of radial stresses constituting the measuring apparatuses inside a groove, in the form of a spiral, machined on a cylinder which is covered with the thin outer casing.

In such an apparatus, the sensors are positioned inside the sprially shaped groove machined in the inner cylinder, spaced apart by a fixed distance so that the set of sensors disposed on the roll corresponds to the total width of the sheet metal and moves successively under the sheet metal supported on the roll, during one or several turns of such roll. By continuously recording the signal from the sensors, a measurement can be obtained of the displacements or radial stresses exerted by the sheet metal on the roll. However, such apparatuses, which provide the results of measurement made on the whole width of the sheet metal in one turn or several turns of the roll by means of sensors whose signal is recorded continuously, have disadvantages since the regions of measurement are not physically separate and the signal recorded is not entirely representative of the state of stresses in the sheet metal at the moment when the same moves over the roll. In addition, with such apparatuses, corrections relating to the response characteristic of the sensor to mechanical stresses and differences in temperature between the various regions of the roll with the sensors on it cannot be made.

Lastly, such apparatuses with continuous recording of the signals from the sensors are not applicable for rotation speeds of the roll which are too high, i.e. for the sheet metal passing at high speeds. This is inconvenient when the apparatus for detecting faults in inherent flatness is to be used in a rolling mill or other high speed installation.

To improve the apparatus described hereinbefore, the creation of separate measuring regions can be envisaged, obtained by machining the inner cylinder so as to produce cavities of small dimension on its whose centers are aligned on a spiral winding around the roll and carrying out a scanning of the whole width of the sheet metal when the roll is working.

A sensor, whose signal represents the radial stresses exerted by the sheet-metal on its passage by the sensor, can be disposed in each cavity.

However, even in this instance, the signal recorded at the different sensors does not represent exactly the state of stress in the sheet metal at the precise moment when the latter is directly above the sensor. In addition, in this instance as well, it is not possible to make corrections for the characteristics of the sensor or for the temperature in a simple way.

In addition, faults in the inherent flatness of the sheet metal are translated into inequalities in pulling stress between the different regions of this sheet metal across its width. It is therefore essential to be able to measure the pulling stress in the sheet metal at different points distributed over the whole width of this sheet metal passing over the roll. None of the known apparatuses described hereinbefore allows an instantaneous measurement to be made of the pulling stress at a predetermined place in the width of the sheet metal.

SUMMARY OF THE INVENTION

The object of the invention is therefore to an apparatus for detecting faults in the inherent flatness of a stretched strip in movement, comprising a deflector roll over which the strip passes, this roll being constituted by an inner cylinder covered by a thin cylindrical casing in which are machined cavities of small dimension opening at the side surface of the cylinder to constitute at least one group of apertures arranged discontinuously on this surface with their center located on a helix having as axis the axis of the roll and at angular positions spaced apart by $2\pi/n$, with n an integer, if one rotation of the roll about its axis is concerned, each of the cavities containing a displacement detector whose moving part in contact with the inner surface of the thin casing has radial displacement with respect to the roll, the set of detectors being connected to means for collecting and processing the signals which they emit when the moving part of the sensors moves under the action of stresses exerted by the sheet metal on the thin casing, this apparatus having to allow a detection of faults by precise measurement of the level of stresses in the sheet metal at the moment it passes over the sensors, with a correction for the effects of the sensors themselves and the temperature, this apparatus also having to allow a measurement of the instantaneous value of the pulling stress at various places distributed over the width of the sheet metal.

To this end, the sensors are of the type including a primary winding and a secondary winding through which a moving magnetic core, solid with the moving part of the sensor, passes, its displacements modifying the signal emitted by the secondary winding when the primary winding is supplied with electric current. The detector apparatus also includes:

(a) an optical encoding system for very precise marking of the angular position of the roll; and (b) a programmable apparatus using the data supplied by the optical encoding system for the successive emission of a pulse of current in the primary windings of each sensor, once under load when the sheet metal is at the sensor, and once not under load, the means for collecting and processing the signals emitted by the sensors at their secondary windings being constituted by a means for measuring the value of the secondary current at a moment predetermined with respect to the beginning of the pulse, a means for converting this value into digital form, a means for storing all the digital values, a means for calculating differences in digital values corresponding to each of the sensors under load and not under load and a means for displaying the results relating to each sensor.

An embodiment of the apparatus for detecting faults in inherent flatness according to the invention, in the case of a measuring roll of great length including several series of cavities including measuring sensors, will now be described, by way of non-limiting example, with reference to the attached figures.

BRIEF DESCRIPTION OF THE DRAWINGS

FIG. 2 is a view in elevation of the deflector roll forming part of the apparatus, represented without the outer cylindrical casing, so as to show the sensor recesses.

FIG. 3 is a section at A—A of FIG. 2.

FIG. 4 is a section at B—B of FIG. 2.

DETAILED DESCRIPTION

Figure 1:
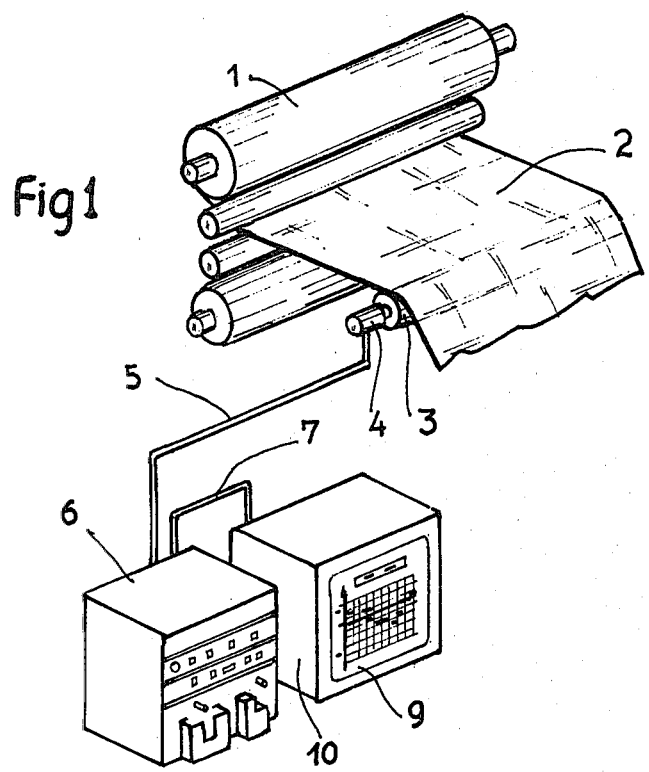
FIG. 1 is a diagrammatic view in perspective of the entire apparatus positioned at the outlet of a rolling-mill housing.

FIG. 1 shows the whole of the apparatus positioned at the outlet of a housing 1 of a cold rolling mill comprising two working rolls and two supporting rolls from which issues the sheet metal strip 2, monitoring of the inherent flatness of which is carried out by passage over the deflector roll 3 arranged to follow the rolling mill housing 1 parallel to the rolls of the latter. A collector 4 is arranged at the end of the roll 3, collecting data coming from the sensors and transmitting it over measuring lines 5 to a unit 6 for collecting and processing electronic signals which is itself connected by connection means 7 to a display means 10 comprising a cathode screen 9 on which the results of the measurements are displayed, allowing faults in inherent flatness to be detected.

Figure 5:
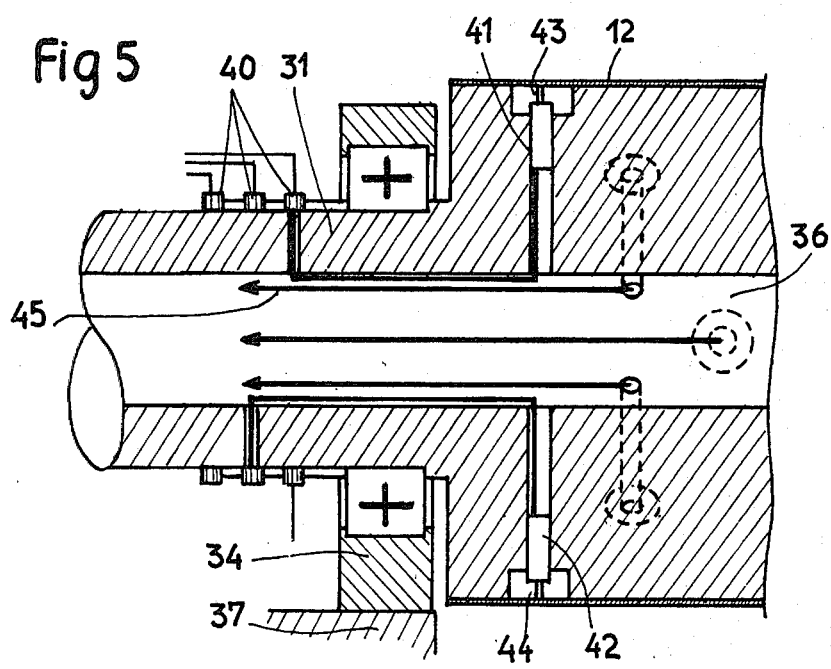
FIG. 5 is a section in a vertical plane of symmetry of the end of the roll at which the signals from the sensors are collected.

FIG. 2 shows the deflector roll 3 and its collector apparatus 4, the roll 3, however, not including the thin outer casing 12 shown in FIG. 5. Thus, the cavities 14, 15, 16 and 17 containing the sensors and constituting groups arranged on spirals wound on the roll are visible in FIG. 2.

In FIGS. 3 and 4, only four groups of four cavities have been shown, arranged angularly at 45° to each other on the roll and spaced apart equally by a distance d over the length of the roll while, over its whole length, the roll has twelve groups of four cavities arranged in the way described, i.e., on portions of spirals.

Each of the cavities of these groups has a corresponding cavity which is symmetrical with respect to the axis of the roll, all the cavities symmetrical with the first cavities constituting the group symmetrical with respect to the axis of the roll.

The group 15 is thus symmetrical with the group 14 and the group 17 is symmetrical with the group 16.

The group 14 comprises the cavities 14a, 14b, and 14c and 14d. The corresponding cavities 15a, 15b, 15c and 15d of the group 15 are respectively symmetrical with the cavities 14a, 14b, 14c and 14d with respect to the axis 25 of the roll.

The angular positioning of these various cavities belonging to the groups 14 and 15 is visible in FIG. 3 in which it will be seen that the angle formed by the planes of symmetry of the various cavities is 45°.

FIG. 4 shows that the groups 16 and 17 are constituted by cavities whose centers are positioned along spirals like the centers of the cavities of the groups 14 and 15, with the same angular spacing and the same axial spacing but with a small shift $\alpha$ visible in FIG. 4, this shift being a few degrees, for example 2°.

The axes of the cavities 14a and 16b are thus in axial planes, i.e. passing through the axis of the roll, together forming an angle $\alpha$.

The cavities of the group 17 are arranged symmetrically with the cavities of the group 16 with respect to the axis of the roll.

Following the groups 14 and 15 and then 16 and 17, other groups such as 18, 19, 20 and 21 are arranged, only one cavity of which has been represented, the cavity 18 being shifted by an angle $2\alpha$ with respect to the cavity 14, the cavity 19 by an angle $3\alpha$, the cavity 20 by an angle $4\alpha$, and the cavity 21 by an angle $5\alpha$.

A cavity which is symmetrical with respect to the axis 25 of the roll is associated with each of the cavities of the groups 18, 19, 20 and 21.

The roll therefore includes, in the case of the present description in which it is used to monitor very wide sheets (1500 mm), twelve groups of four cavities, i.e., forty-eight cavities.

As shown by FIGS. 3, 4 and 5, each of the cavities comprises a group of two bores with the same axis and different diameters, one opening into the central cavity of the roll 30 and the other externally of the roll on the side surface of the latter covered by the thin casing 12.

The roll is actually a hollow roll constituted by a cylindrical casing at the end of which are added or machined support shafts 31 and 32 allowing the roll to be mounted to turn in the bearings 34 and 35 which are themselves fixed on the frame 37 of the installation.

The collector 4, comprising an outer casing fixed on the frame 37 and contact brushes 40 in rubbing contact with the shaft-end 31 at the electrical connections of each of the sensors, is also fixed at one of the ends of the roll.

Inside each cavity of the roll, a variable current sensor such as 41 or 42 is disposed, with a moving part 43 (or 44) whose end is in contact with the thin casing 12 which itself comes into contact with the sheet metal when the latter passes over the roll. The variable current sensors such as 41 or 42 also include a fixed part comprising two windings wound one over the other, one constituting the primary winding and the other the secondary winding of a current transformer, whose core, common to the two windings, disposed on the axis of the two windings, constitutes with the rods 43 and 44 which are solid with the corresponding ferromagnetic core the moving part of the sensor.

It is understood that in such a sensor of known type the secondary current varies with the position of the core inside the windings, this position being modifiable by displacement of the rods such as 43 when these are acted upon at their end by the thin casing 12 which is itself deformed by the sheet metal.

The primary circuits of each sensor are connected electrically to one of the rings of the collector 4 to supply it with current via a brush 40 while the secondary circuits of each sensor are also connected electrically to one of the rings of the collector to collect the signal emitted by the secondary circuit by means of another brush 40 of the collector 4.

Each sensor such as 41 is therefore connected by a set of supply or collecting wires such as 45 to the rings of the collector disposed at the end of the shaft 31.

It is possible in this way to supply the primary circuits of the collectors and to collect the current from the secondary circuits by means of a set of wires passing into the central cavity 30 of the inner cylinder of the deflector roll 3.

The brushes of the collector are connected electrically to the unit 6 represented in FIG. 1 allowing supplying of the primary circuits and the collecting and processing of the signals from the secondary circuits of the set of sensors, via the cable 5 combining the set of electrical wires connected to each sensor.

At the end of the shaft 31 of the roll, following the collector, an optical encoding apparatus 50 with 1,024 positions is also disposed permitting very accurate determination of the angular position of the roll, by means of a reader.

The angular position of the roller is determined in digital form and transmitted to the processing unit 6, by means of this reader.

As the position of the various cavities with the sensors in them is very precisely marked with respect to the roll, it is possible to determine exactly the passage of a given sensor at the sheet metal which covers the upper part of the roll on passing over it.

As the various groups of cavities 14, 16, 18, 19, 20 and 21 and the sensors they contain are shifted from each other by an angle α along the length of the roll, the greatest shift, i.e., between the group 14 and the group 21, being, however, less than the angular shift between two cavities located on a spiral, one after the other, i.e., 45°, simultaneous passage of two sensors at the highest level of the roll where the sheet metal passes over cannot occur.

In this way, there is always only one sensor at a time under load at the highest generatrix of the roll. The supply-and-processing unit 6 is therefore programmed to send a pulse of current to each of the sensors at the moment when they are under load under the sheet metal at or near the upper part of the roll.

At this moment, the sheet metal causes a deformation of the thin casing of the roll at the cavity with the sensor in it which is transmitted to the rod of the sensor in contact with the inner surface of the casing.

This deformation and the displacement of the sensor are proportional to the instantaneous and local value of the pulling stress in the strip.

The current in the secondary circuit of the sensor depends on the position of the core solid with the rod of the sensor and constituting with this rod the moving part of this sensor. The value of this secondary current at a predetermined moment after the beginning of the pulse is a simple function of the displacement of the moving part of the sensor, i.e., of the pulling stress.

The processing unit 6 therefore sends a pulse of current through the primary circuit of a predetermined sensor which is directly below the sheet for a given position of the roll, the measures the value of the secondary current after a delay equal to a fraction of the duration of the pulse with respect to the beginning of this pulse and finally converts this measurement of the secondary current into a digital value.

This numerical value of the current is then kept in the processing unit 6.

When the sensor whose secondary current under load has been measured has arrived in a certain position in which it is distant from the region covered by the sheet metal and is not under load, measurement of the secondary current is made the same way as before, a pulse being sent into the primary circuit for a certain value of the position of the roll determined by the optical encoder.

Then the difference between the values under load and not under load of the current for one and the same sensor is obtained, which allows freedom from factors interfering with the measurement of error.

The same operations are carried out successively for all the sensors in the cavities of the groups 14, 16, 18, 19, 20 and 21, and the set of values of the secondary currents representative of the values of the pulling stress over the whole width of the sheet metal covering the said roll at these sensors are calculated and stored and then transmitted to the display apparatus 10 which allows a representation of the values of the pulling stress over the width of the strip to be plotted, as shown in FIG. 1.

The sensors in the cavities of the groups 15, 17 and the symmetrical groups of the groups 18, 19, 20 and 21 are stand-by sensors which are not used during measuring but can be instantaneously brought into operation, if one or several of the sensors of the groups in service is unserviceable. In this way, the measuring apparatus can always be used to its maximum detecting capacity.

It will be seen that the principal advantages of the apparatus according to the invention are that it allows measurement of a local and instantaneous value of the pulling stress in the strip, this measurement not being spoilt by errors, since the same measurement is made with the sensor under load and not under successively, that the measurement can be made whatever the speed of the roll, and that numerical values representative of the values of the pulling stress on the width of the strip are instantaneously available.

In addition, the applicant's tests have shown that the sensitivity of the sensors and the measurement chain are such that faults in inherent flatness which translate into displacements of the rods of the sensors of the order of only a few microns or even a few tenths of microns can be detected.

The invention is not limited to the embodiment just described, but includes all the variants thereof.

Thus, while a flatness roll has been described, usable with a very wide strip, in which the cavities containing the sensors are axially spaced apart by a distance d of the order of 60 mm and centered on axial planes forming angles of 45° with respect to each other it is possible to envisage other arrangements for these sensors, on helices with the axis of the roll as axis, the angle of angular separation being other than 45°, for example.

In the case of a narrower roll, it is possible to use fewer sensors to test narrower sheets, there sensors being disposed in cavities arranged in groups disposed on spirals wound on the roll with the same arrangement and spacing as in the example just described.

Instead of twelve groups of sensors as described, it is possible to use a smaller number, and it is also possible to avoid the use of stand-by sensors.

Instead of an output on a cathode screen display apparatus as described, an output on any medium in graphic or numerical form can be used.

The numerical values of the pulling stress can also be envisaged in direct use, as inputs which can be used by a system for automatic adjustment of the rolling mill or the installation for processing the strip, with the apparatus for detecting faults in inherent flatness at its outlet.

Lastly, the apparatus according to the invention can be used not only at the outlet of cold-rolling mills for a strip of thin sheet or other installations for processing thin sheets, but also in association with any installations for processing strips in which it is essential to obtain a high degree of inherent flatness.

I claim:

1. Apparatus for detecting faults in the inherent flatness of a stretched moving strip, comprising
(a) a deflector roll (3) over which the strip passes, said roll comprising an inner cylinder covered by a thin cylindrical casing (12);
(b) cavities (14, 15, 16, 17) of small dimension machined in the side surface of said cylinder so as to constitute at least one group of apertures arranged discontinuously over said surface, the centers of said cavities being located on a helix coaxial with said roll and in angular positions spaced apart by $2\pi/n$, with n an integer, if one rotation of the roll about its axis is concerned;
(c) each said cavity containing a displacement sensor (41, 42) having a moving part (43, 44) in contact with the inner surface of said thin casing (12) for radial displacement with respect to said roll;
(d) said sensors being connected by means (6) for collecting and processing signals which they emit when said moving part moves under the action of the stresses exerted by said strip on said thin casing;
(e) said sensors (41, 42) each comprising a primary winding and a secondary winding through which a moving ferromagnetic core passes, solid with said moving part (43, 44) of said sensor, modifying by its displacements the signal emitted by said secondary winding when said primary winding is supplied with electric current;
(f) an optical encoding system (50) for very precise marking of the angular position of said roll (3); and
(g) a programmable apparatus using data supplied by said optical encoding system (50) for emitting a current pulse to said primary winding of each sensor once under load when said strip is at said sensor and once not under load;
(h) said means (6) for collecting and processing the signals emitted by said sensors (41, 42) at their secondary windings comprising
  (i) means for measuring the value of the secondary current at a moment predetermined with respect to the beginning of the pulse;
  (ii) means for converting this value into numerical form;
  (iii) means for storing all the numerical values;
  (iv) means for callculating the differences in said numerical values corresponding to each of said sensors under load and not under load; and
  (v) means (9) for displaying the results relating to each sensor.

2. Detector apparatus according to claim 1, wherein said sensors (41, 42) are disposed in cavities constituting several groups (14, 15, 16, 17) arranged in succession in the axial direction of said roll, the corresponding cavities of each group being offset with respect to one another in the axial direction of said roll, by a constant angle less than the angle of angular spacing of the cavities of one and the same group.

3. Detector apparatus according to claim 1 or 2, wherein two identical sets of sensors are disposed in the cavities (14, 15) symmetrically in pairs with respect to the axis of said roll (3), one of said sets being intended to be brought completely into service while the other set is not being used.

4. Detector apparatus according to claim 1 or 2, wherein said cavities (14a, 14b) and said sensors (41) are arranged at angular positions spaced apart by 45° if one rotation of the roll about its axis is concerned.

* * * * *